(12) United States Patent
Spektor et al.

(10) Patent No.: US 10,044,821 B2
(45) Date of Patent: *Aug. 7, 2018

(54) CONTENT ACTIVITY FEEDBACK INTO A REPUTATION SYSTEM

(71) Applicant: Microsoft Technology Licensing, LLC, Redmond, WA (US)

(72) Inventors: Daron Spektor, Seattle, WA (US); Chinna B. Polinati, Snoqualmie, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 982 days.

This patent is subject to a terminal disclaimer.

(21) Appl. No.: 14/502,669

(22) Filed: Sep. 30, 2014

(65) Prior Publication Data

US 2015/0019560 A1 Jan. 15, 2015

Related U.S. Application Data

(63) Continuation of application No. 12/467,131, filed on May 15, 2009, now Pat. No. 8,868,439.

(51) Int. Cl.
*G06F 15/173* (2006.01)
*H04L 29/08* (2006.01)
(Continued)

(52) U.S. Cl.
CPC ........ *H04L 67/22* (2013.01); *G06F 17/30598* (2013.01); *G06F 17/30864* (2013.01);
(Continued)

(58) Field of Classification Search
USPC ........... 709/203, 223, 224, 225, 226; 726/26
See application file for complete search history.

(56) References Cited

U.S. PATENT DOCUMENTS 7,461,051 B2 12/2008 Lavine
8,868,439 B2 10/2014 Spektor et al.
(Continued)

OTHER PUBLICATIONS

"Final Office Action", U.S. Appl. No. 12/467,131, dated Oct. 23, 2013, 21 pages.
(Continued)

*Primary Examiner* — Liangche A Wang (57) ABSTRACT

Various embodiments provide an evaluation module that is configured to monitor activities of new users and ascertain, from monitored activities, a reputation associated with the new users. In at least some embodiments, the evaluation module comprises an activity store and/or a reputation service. The activity store can monitor different types of actions associated with new users. For example, the activity store can monitor content-based actions that pertain to particular pieces of content and/or user behaviors associated with new users. The reputation service, which may or may not comprise part of the evaluation module, can ascertain from information provided from the activity store, information, such as a reputation category, associated with content-based actions and/or user behaviors associated with new users. Based on a new user's information, e.g. reputation category, the new user can be assigned an activity type which, in turn, defines allowed and disallowed activities for the new user.

20 Claims, 6 Drawing Sheets

(51) Int. Cl.
   G06F 21/31       (2013.01)
   G06F 21/55       (2013.01)
   G06Q 10/06       (2012.01)
   G06Q 30/00       (2012.01)
   G06Q 30/02       (2012.01)
   H04L 29/06       (2006.01)
   G06F 17/30       (2006.01)

(52) U.S. Cl.
   CPC .......... *G06F 21/316* (2013.01); *G06F 21/552* (2013.01); *G06Q 10/0635* (2013.01); *G06Q 30/0185* (2013.01); *G06Q 30/02* (2013.01); *H04L 63/102* (2013.01); *G06F 2221/2101* (2013.01)

(56) References Cited

U.S. PATENT DOCUMENTS

| | | | |
|---|---|---|---|
| 2002/0198748 A1* | 12/2002 | Eden | G06Q 10/10 705/320 |
| 2006/0026123 A1 | 2/2006 | Moore | |
| 2006/0026680 A1* | 2/2006 | Zakas | H04L 29/06 726/22 |
| 2007/0067853 A1* | 3/2007 | Ramsey | G06F 21/316 726/28 |
| 2007/0179834 A1 | 8/2007 | Carter | |
| 2007/0192169 A1 | 8/2007 | Herbrich | |
| 2008/0077517 A1 | 3/2008 | Sappington | |
| 2008/0235200 A1* | 9/2008 | Washington | G06F 21/10 |
| 2010/0293016 A1 | 11/2010 | Spektor | |

OTHER PUBLICATIONS

"Final Office Action", U.S. Appl. No. 12/467,131, dated Sep. 16, 2011, 20 pages.

"Non-Final Office Action", U.S. Appl. No. 12/467,131, dated Apr. 3, 2013, 17 pages.

"Non-Final Office Action", U.S. Appl. No. 12/467,131, dated Apr. 2, 2014, 21 pages.

"Non-Final Office Action", U.S. Appl. No. 12/467,131, dated Jun. 9, 2011, 14 pages.

"Notice of Allowance", U.S. Appl. No. 12/467,131, dated Jun. 12, 2014, 8 pages.

Adler, et al., "A Content-Driven Reputation System for the Wikipedia", Retrieved from: <http://www2007.org/papers/paper692.pdf> on Mar. 13, 2009, 2007, pp. 261-270.

Gupta, et al., "A Reputation System for Peer-to-Peer Networks", NOSSDAV '03, Available at <http://www.cs.indiana.edu/~minaxi/pubs/reputation.pdf.>,Jun. 2003, 9 Pages.

Mortazavi, et al., "Cumulative Reputation Systems for Peer-to-Peer Content Distribution", 40th Annual Conference on Information Sciences and Systems, 2006, Available at <http://www.princeton.edu/optnet/314.pdf>,Mar. 2006, pp. 1-7.

* cited by examiner

CONTENT ACTIVITY FEEDBACK INTO A REPUTATION SYSTEM

RELATED APPLICATIONS

This application is a continuation of and claims priority to U.S. patent application Ser. No. 12/467,131 filed May 15, 2009 entitled "Content Activity Feedback into a Reputation System." The entire teachings of the above application is incorporated herein by reference.

BACKGROUND

Online storage services, as well as other services, are frequently targets for abuse. Among such services is the Windows® Live suite of services offered by Microsoft Corp. A typical abuse scenario involves a person opening a new account, uploading a large number of files, and distributing the files on a file sharing site from the storage service.

There exist a number of abuse mitigation measures that attempt to address this and other problems. However, many of the abuse mitigation measures are reactive in the sense that the measures monitor a specific account over an extended period of time to ascertain whether the account follows particular patterns associated with abuse. Such patterns can include using an inordinate amount of bandwidth over time, receiving too many requests for files over time, and the like. These and other measures, however, tend to be ineffective with respect to new users. This is because new users do not have a history of past activities over time to serve as a basis for making a decision with respect to the particular user. Some systems have imposed strict restrictions on new users or have forced new users to validate themselves by supplying a cell phone number or some other type of personal information. These approaches can provide a poor user experience and can hurt the uptake of a service.

SUMMARY

Various embodiments provide an evaluation module that is configured to monitor activities of new users and ascertain, from monitored activities, a reputation associated with the new users. In at least some embodiments, the evaluation module comprises an activity store and/or a reputation service. The activity store can monitor different types of actions associated with new users. For example, the activity store can monitor content-based actions that pertain to particular pieces of content and/or user behaviors associated with new users. The reputation service, which may or may not comprise part of the evaluation module, can ascertain from information provided from the activity store, information, such as a reputation category, associated with content-based actions and/or user behaviors associated with new users. Based on a new user's information, e.g., reputation category, the new user can be assigned an activity type which, in turn, defines allowed and disallowed activities for the new user.

In at least some embodiments, the evaluation module can comprise part of a service, such as an on-line storage service that stores various types of content for users.

DETAILED DESCRIPTION

Overview

Various embodiments provide an evaluation module that is configured to monitor activities of new users and ascertain, from monitored activities, a reputation associated with the new users. In at least some embodiments, the evaluation module comprises an activity store and/or a reputation service. The activity store can monitor different types of actions associated with new users. For example, the activity store can monitor content-based actions that pertain to particular pieces of content and/or user behaviors associated with new users. The reputation service, which may or may not comprise part of the evaluation module, can ascertain from information provided from the activity store, information, such as a reputation category, associated with content-based actions and/or user behaviors associated with new users. Based on a new user's information, e.g. reputation category, the new user can be assigned an activity type which, in turn, defines allowed and disallowed activities for the new user.

In at least some embodiments, the evaluation module can comprise part of a service, such as an on-line storage service that stores various types of content for users.

In the discussion that follows, a section entitled "Operating Environment" is provided and describes an environment in which the various embodiments may operate. Following this, a section entitled "Evaluation Module" describes an example evaluation module in accordance with one or more embodiments. Next, a section entitled "Activity Store" describes an example activity store in accordance with one or more embodiments. Following this, a section entitled "Reputation Service" describes an example reputation service in accordance with one or more embodiments. Next, a section entitled "Example Method" describes an example method in accordance with one or more embodiments. Last, a section entitled "Example System" describes an example system that can be utilized to implement one or more embodiments.

Operating Environment

Figure 1:
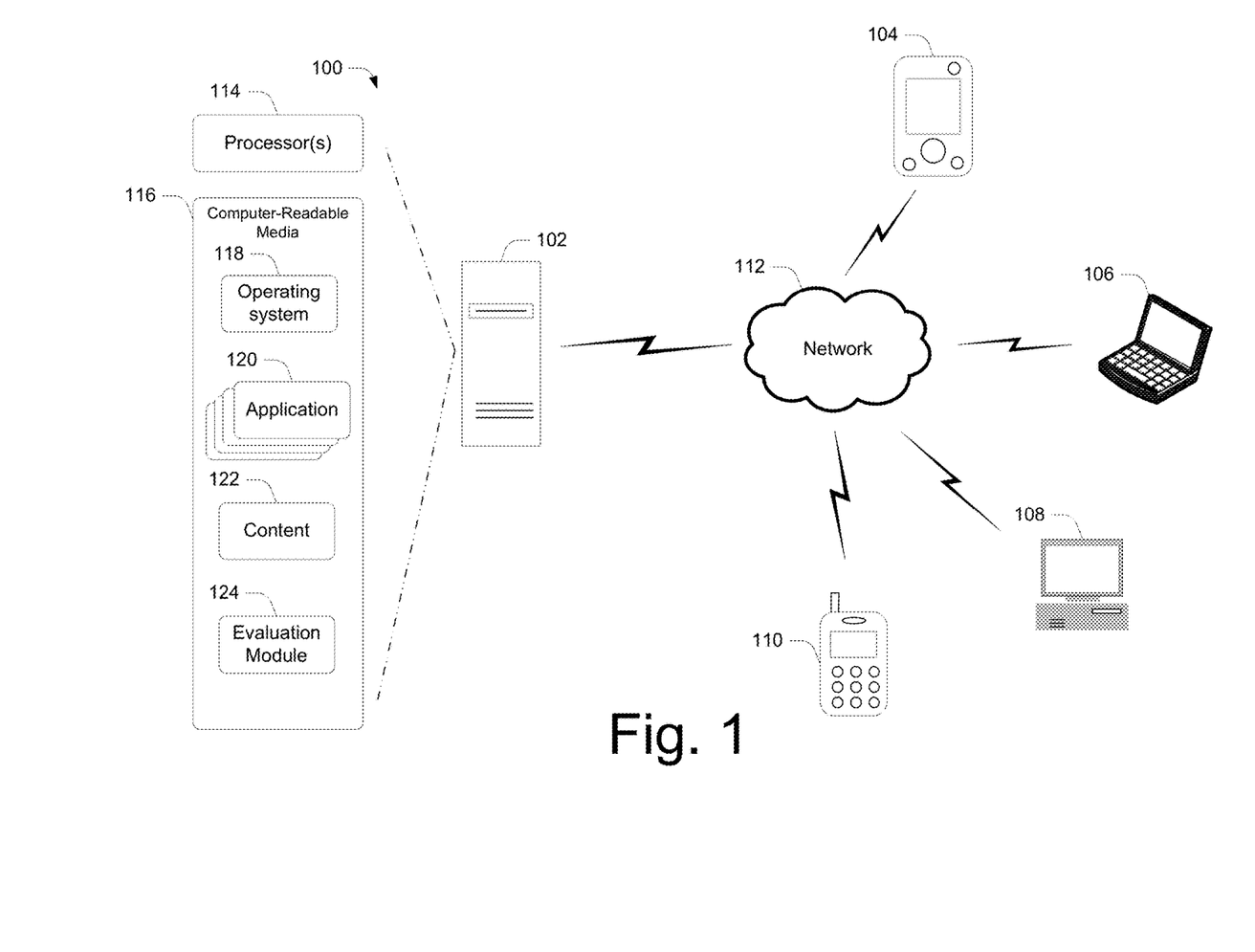
FIG. 1 illustrates an operating environment in accordance with one or more embodiments.

FIG. 1 illustrates an operating environment in accordance with one or more embodiments, generally at 100. Operating environment 100 includes one or more servers 102 and multiple different user computing devices examples of which are shown at 104, 106, 108, and 110. Server 102 can be used to implement any suitable type of service, such as a content storage service. The computing devices can be used by a user to consume or otherwise interact with content, examples of which can include various types of files such as audio files, video files, multimedia files and the like. Server 102 and computing devices 104, 106, 108, and 110 can interact with one another through a network 112. Network 112 can comprise any suitable type of network such as a local area network (LAN) or wide area network (WAN). In at least some embodiments, network 112 includes, at least in part, the Internet.

Server 102 can typically include one or more processors 114, one or more computer-readable storage media 116, an operating system 118, and one or more applications 120 that reside on the computer-readable storage media and which are executable by the processor(s).

In addition, in one or more embodiments, computer-readable storage media 116 can store content 122 for various users. Such content can include, by way of example and not limitation, various types of files such as audio files, video files, multimedia files, and the like. In addition, computer-readable storage media 116 can include an evaluation module 124 that is configured to monitor activities of new users and ascertain, from monitored activities, a reputation associated with the new users. The reputation of a new user can then be used as a basis to define allowed and disallowed activities for the new user, as described below in more detail. In at least some embodiments, the evaluation module 124 can be implemented as part of a service, such as an on-line storage service. One example of an on-line storage service is Microsoft's Windows® Live storage service. Other storage services can be used without departing from the spirit and scope of the claimed subject matter.

The computer-readable storage media 116 can include, by way of example and not limitation, all forms of volatile and non-volatile memory and/or storage media that are typically associated with a computing device. Such media can include ROM, RAM, flash memory, hard disk, removable media and the like.

The user computing devices can be embodied as any suitable computing device such as, by way of example and not limitation, a desktop computer (such as computing device 108), a portable computer (such as computing device 106), a handheld computer such as a personal digital assistant (such as computing device 104), a cell phone (such as computing device 110), and the like. One example of a computing device is shown and described below in relation to FIG. 6.

Having discussed the general notion of an example operating environment in which various embodiments can operate, consider now a discussion of an example evaluation module in accordance with one or more embodiments.

Evaluation Module

Figure 2:
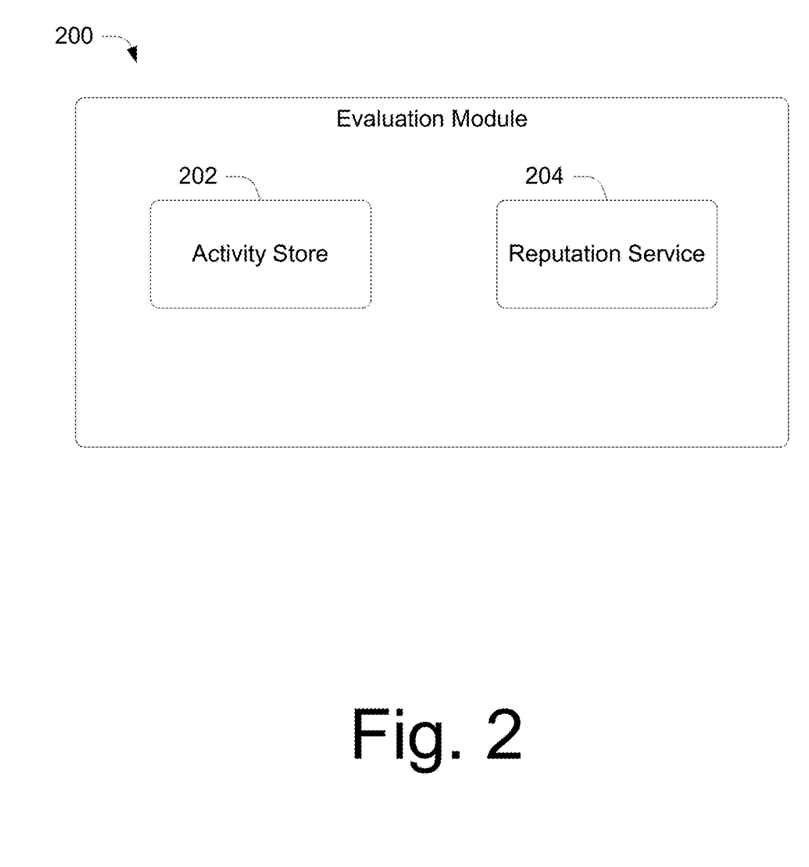
FIG. 2 illustrates an example evaluation module in accordance with one or more embodiments.

FIG. 2 illustrates an example evaluation module in accordance with one or more embodiments generally at 200. Evaluation module 200 can be implemented in connection with any suitable hardware, software, firmware, or combination thereof. In at least some embodiments, the evaluation module is implemented, at least in part, in software.

In this example, evaluation module 200 includes or otherwise makes use of an activity store 202 and a reputation service 204. It is to be appreciated and understood that reputation service 204 can comprise part of the evaluation module 200, or can comprise a separate component or module that is utilized by the evaluation module 202.

In one or more embodiments, activity store 202 maintains information associated with content-based actions and/or user behaviors. The content-based actions and/or user behaviors can be those that are associated with new users that have recently signed on to a particular service with which evaluation module 200 is associated. As a new user begins to perform actions within the particular service, the activity store 202 logs content-based actions and/or user behaviors. The activity store 202 can then provide the reputation service 204 with information associated with performed actions on behalf of the new user.

The reputation service 204 can, in at least some embodiments, maintain mappings between content-based actions and/or user behaviors and information such as reputation categories or reputations. The mappings that are maintained by the reputation service 204 can be based on historical data that is collected by the reputation service over time. Based on the information that the reputation service 204 receives from the activity store 202 for a particular new user, a reputation or reputation category can be assigned to the particular new user. The reputation category can, in turn, define a set of allowed and disallowed actions for the particular new user. In this way, a new user can be quickly assigned a reputation. Based on the new user's actions and the reputation service's assignment of the reputation for the new user, a set of allowed actions can be more accurately assigned in a much quicker fashion, rather than in a reactive fashion after a period of the abuse has occurred. The set of allowed actions can be assigned by any suitable entity. For example, in at least some embodiments, the set of allowed actions can be assigned by the reputation service 204. Alternately or additionally, the set of allowed actions can be assigned by a service with which activity store 202 is associated. In at least some embodiments, the reputation service 204 can be utilized by other services to provide a measure of reputations which can then be utilized by the other services to assign their own specific sets of allowed and disallowed actions.

Having considered a discussion of an example evaluation module in accordance with one or more embodiments, consider now a discussion of an example activity store in accordance with one or more embodiments.

Activity Store

Figure 3:
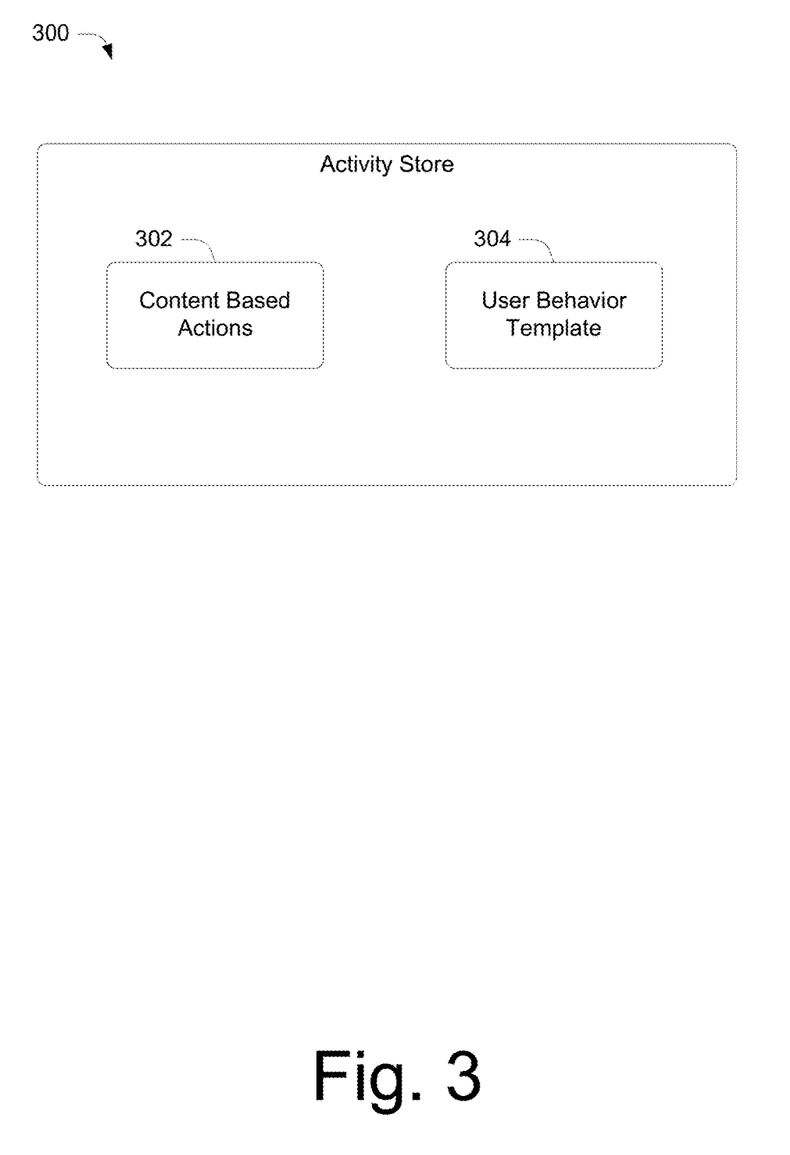
FIG. 3 illustrates an example activity store in accordance with one or more embodiments.

FIG. 3 illustrates an example activity store in accordance with one or more embodiments generally at 300. In this particular example, activity store 300 includes or otherwise makes use of a content-based actions module 302 and/or a user behavior template module 304.

In the illustrated and described embodiment, content-based actions module 302 monitors content-based actions that a new user takes with respect to various content. In one or more embodiments, a collection of initial new user actions can be monitored. The initial new user actions can be the first actions that a new user performs after signing up for a particular service. Any suitable types of content-based actions can be the subject of monitoring activities. Typically, those content-based actions that are subject to abuse scenarios are those actions for which monitoring occurs. For example, if a new user takes a particular action with respect to a file that other users have taken an action with, information maintained by the activity store can be updated to reflect this. As an example, if a new user uploads or downloads a particular file or files, a hash of the file or portions thereof can be taken, and a record maintained by the activity store 300 associated with the particular hash can be updated. The record can include, by way of example and not limitation, the file hash, the number of uploads of the file, the number of downloads of the file, and/or whether the file has been confirmed as being abuse-related. In addition, the record can include, in at least some embodiments, an indication of the average reputation of downloaders and uploaders of the file. In one or more embodiments, the records maintained by the activity store 300 can include file names, as well as the other information mentioned above.

In one or more embodiments, the information collected by the activity store 300 with respect to a new user can be provided to reputation service 204 (FIG. 2). Using the information provided to it by the activity store 300, the reputation service 204 can assign a reputation category to the new user and provide the reputation category to the service with which the activity store 300 is associated. Based on the assigned reputation category, the service with which activity store 300 is associated (or some other entity) can define a set of allowed and disallowed actions for the particular new user.

In the illustrated and described embodiment, user behavior template module 304 monitors various user behaviors that are taken by new users. Any suitable type of user behavior can be monitored. In one or more embodiments, a collection of initial new user behaviors can be monitored. The initial new user behaviors can be the first behaviors that a new user exhibits after signing up for a particular service. The types of behavior that can be monitored include those types of behavior associated with abuse activities. For example, user behavior template module 304 can monitor for the number of files that a new user uploads or downloads. For example, a new user may upload 100 files within minutes of opening a new account. This information is logged by activity store 300 and provided to the reputation service 204 (FIG. 2) for evaluation. Alternately or additionally, user behavior template module 304 can monitor the bandwidth that a new user utilizes. Other parameters of a new user's behavior can be monitored as well. For example, parameters include, by way of example and not limitation, type of content uploaded, average of downloads per unit of time (e.g., per second), time between actions (e.g., too fast may imply automated behavior) and the like.

Having considered an example activity store in accordance with one or more embodiments, consider now a discussion of an example reputation service in accordance with one or more embodiments.

Reputation Service

Figure 4:
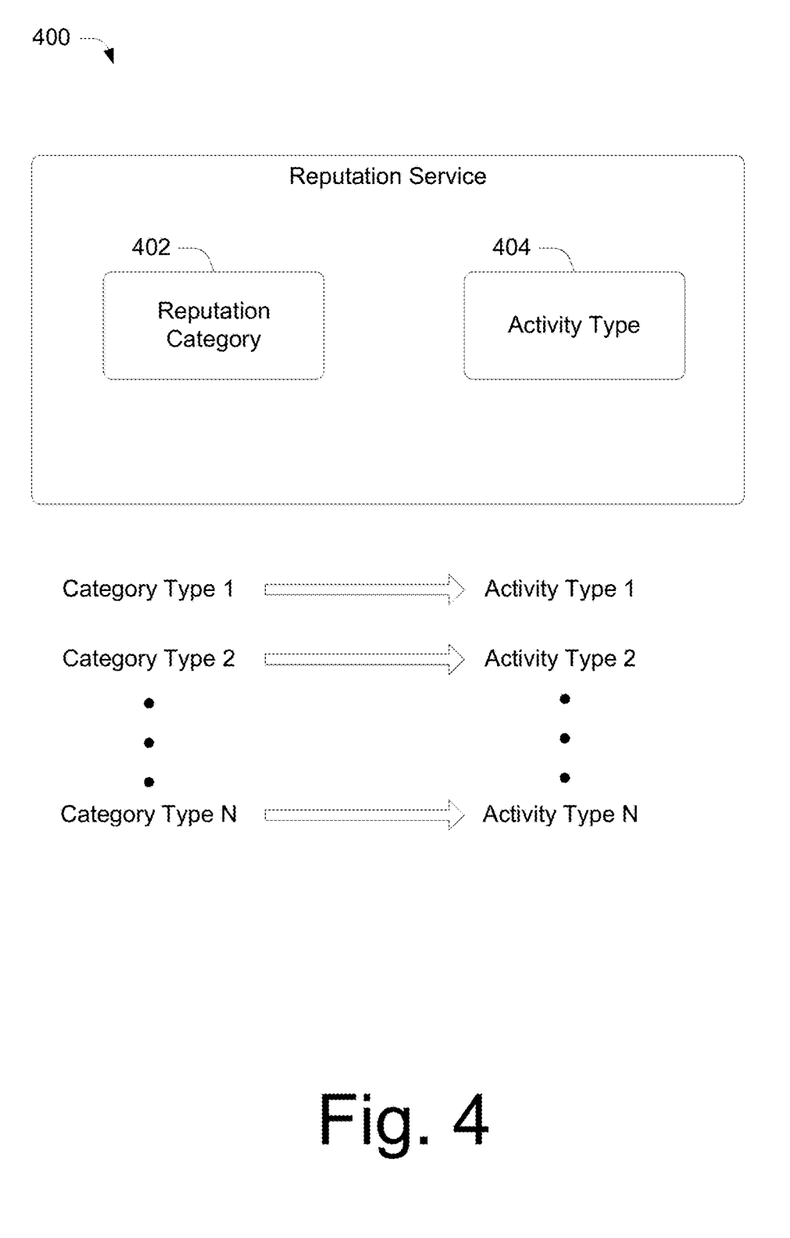
FIG. 4 illustrates an example reputation service in accordance with one or more embodiments.

FIG. 4 illustrates an example reputation service in accordance with one or more embodiments generally at 400. In the illustrated and described embodiment, reputation service 400 includes a module that is used to ascertain information associated with a new user. In the illustrated example, the module resides in the form of a reputation category module 402. Reputation service 400 can also include an activity type module 404. It is to be appreciated and understood, however, that the activity type module 404 and its functionality can reside with another entity such as, for example, the service with which activity store 300 (FIG. 3) is associated.

In the illustrated and described embodiment, the reputation category module 402 defines various reputation category types that can be assigned to new users. Reputation category types can vary along a spectrum from trusted to untrusted. The variance along this spectrum can occur at any suitable level of granularity and can consider any suitable criteria in defining a category type. For example, less trusted category types may be allocated to newer users. Category types that are more trusted may be allocated to users who pay money for subscriptions, users who have subscribed to a particular service for a long time, and/or users who are friends with other users who have high reputations.

It is to be appreciated and understood that the reputation service can assign reputation category types in any suitable way. In one or more embodiments, reputation category types can be associated with activity types. Specifically, activity type module 404 can include a collection of activities that are associated with individual reputation category types to define an activity type for that individual reputation category type. These collections of activities can define allowed activities or actions and disallowed activities or actions for new users. Activities or actions can include, by way of example and not limitation: uploading and downloading files, the number of files a new user can upload or download, the size of files a new user can upload or download, bandwidth that can be used by a new user to upload or download files, bandwidth that other users can utilize to download from a new user, whether a new user can share their content to the public or share their content only to friends who have logged into the service. Alternately or additionally, activities can include permissions or restrictions on certain file types that have been subject to abuse in the past. For example, uploading or downloading ".zip" files may be restricted for newer users.

Having considered an example reputation service in accordance with one or more embodiments, consider now an example method in accordance with one or more embodiments.

Example Method

Figure 5:
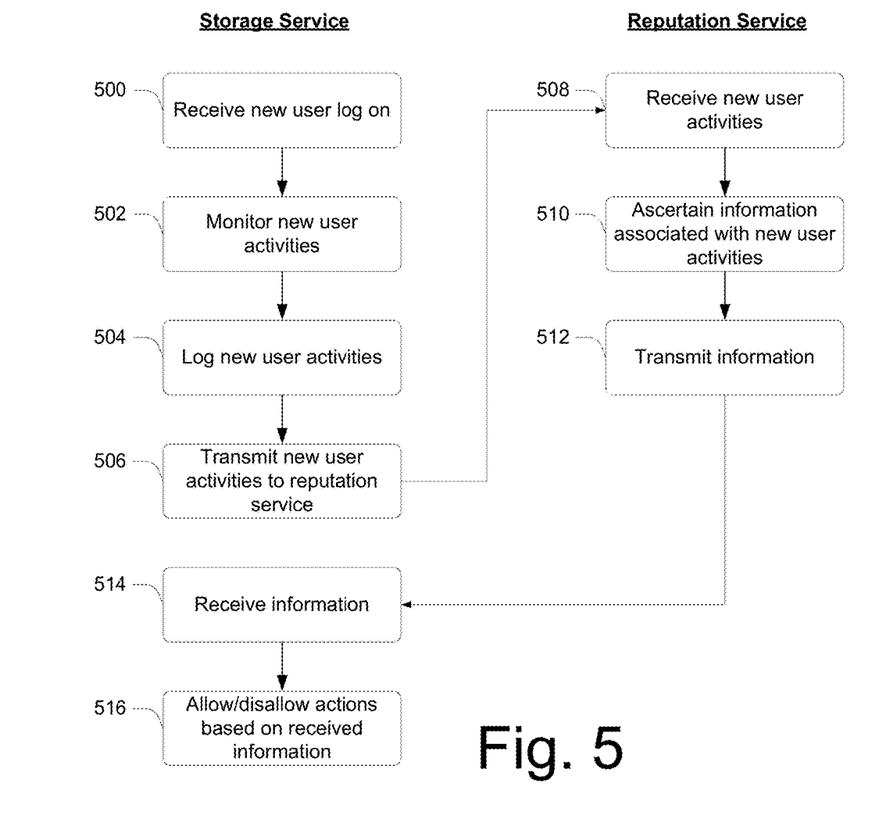
FIG. 5 is a flow diagram that illustrates steps in a method in accordance with one or more embodiments.

FIG. 5 is a flow diagram that illustrates steps in a method in accordance with one or more embodiments. The method can be implemented in connection with any suitable hardware, software, firmware, or combination thereof. In at least some embodiments, the method can be implemented in software. In the illustrated example, some steps of the method are illustrated as being performed by a "Storage Service," and other steps of the method are illustrated as being performed by a "Reputation Service." It is to be appreciated and understood that the steps that are illustrated as being performed by the Storage Service can be performed by any suitable type of service or entity. Accordingly, these steps can be performed by services other than storage services.

Step 500 receives a new user log on. This step can be performed in any suitable way. For example, this step can be performed when a new user initially signs up for a new online service. An online service can include a plurality of services, such as a log in service, a storage service, and/or other services. Typically, a user can sign up for a new service by providing information such as the user's name, e-mail address, and other relevant information. Step 502 monitors new user activities. Any suitable type of activities can be monitored examples of which are provided above. For example, in at least some embodiments activities associated with content-based actions can be monitored. Alternately or additionally, various user behaviors can be monitored. Responsive to monitoring new user activities, step 504 logs new user activities and step 506 transmits new user activities to a reputation service.

Step 508 receives, at the reputation service, the new user activities. Step 510 ascertains information associated with the new user activities. Any suitable type of information can be ascertained. For example, in at least some embodiments, the information can comprise a reputation category associated with new user activities. This step can be performed in any suitable way. For example, when the reputation service receives the new user activities, it can compare those activities with a collection of historical activities that indicate whether or not the activities are associated with a pattern that indicates an abuse scenario. Step 512 transmits the information, e.g., the reputation category, associated with the new user to the service from which it received the new user activities.

Step 514 receives the information from the reputation service and step 516 allows or disallows new user actions based upon the received information. This step can be performed in any suitable way examples of which are provided above.

Having described an example method in accordance with one or more embodiments, consider now a discussion of an example system that can be utilized to implement the embodiments described above.

Example System

Figure 6:
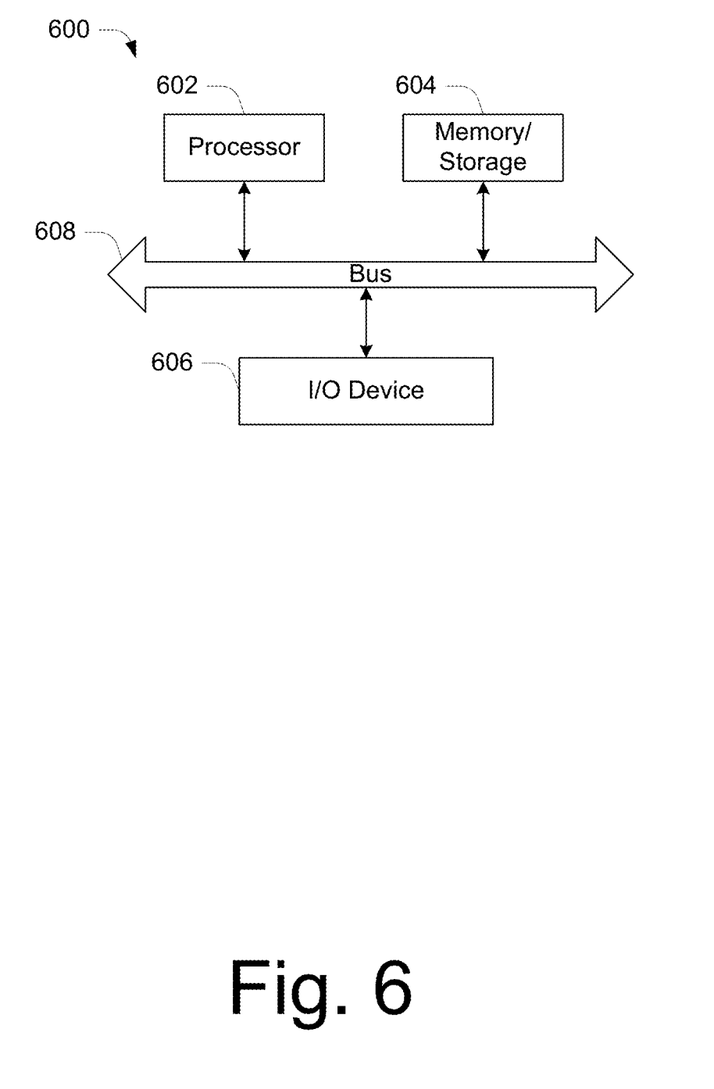
FIG. 6 illustrates an example computing device that can implement various embodiments.

FIG. 6 illustrates an example computing device 600 that can implement the various embodiments described above. Computing device 600 can be, for example, various computing devices or servers, such as those illustrated in FIG. 1, or any other suitable computing device.

Computing device 600 includes one or more processors or processing units 602, one or more memory and/or storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Component 604 can include volatile media (such as random access memory (RAM)) and/or nonvolatile media (such as read only memory (ROM), Flash memory, optical disks, magnetic disks, and so forth). Component 604 can include fixed media (e.g., RAM, ROM, a fixed hard drive, etc.) as well as removable media (e.g., a Flash memory drive, a removable hard drive, an optical disk, and so forth).

One or more input/output devices 606 allow a user to enter commands and information to computing device 600, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments described above provide an evaluation module that is configured to monitor activities of new users and ascertain, from monitored activities, a reputation associated with the new users. In at least some embodiments, the evaluation module comprises an activity store and/or a reputation service. The activity store can monitor different types of actions associated with new users. For example, the activity store can monitor content-based actions that pertain to particular pieces of content and/or user behaviors associated with new users. The reputation service, which may or may not comprise part of the evaluation module, can ascertain from information provided from the activity store, information, such as a reputation category, associated with content-based actions and/or user behaviors associated with new users. Based on a new user's information, e.g., reputation category, the new user can be assigned an activity type which, in turn, defines allowed and disallowed activities for the new user.

In at least some embodiments, the evaluation module can comprise part of a service, such as an on-line storage service that stores various types of content for users.

Although embodiments have been described in language specific to structural features and/or methodological steps, it is to be understood that the embodiments defined in the appended claims are not necessarily limited to the specific features or steps described. Rather, the specific features and steps are disclosed as example forms of implementing the claimed embodiments.

What is claimed is:

1. A computer-implemented method comprising:
   receiving a new user log on associated with a user initially signing up for an online service;
   monitoring, by at least one computer, new user activities comprising first actions of the user after signing up for the online service, the new user activities including comprising file-related actions associated with file sharing, at least one of the file-related actions comprising uploading one or more files using the online service;
   logging, by at least one computer, the new user activities, the logging including logging an identifier of the one or more uploaded files and a number of total file uploads;
   transmitting the new user activities to a reputation service;
   receiving, from the reputation service a reputation category of the user, the reputation category assigned to the user based on a comparison of the new user activities with a collection of historical activities associated with other users that indicate whether or not the new user activities are associated with a pattern that indicates an abuse pattern; and
   allowing or disallowing, by at least one computer, new user actions for the user based upon the reputation category of the user received from the reputation service.

2. The computer-implemented method of claim 1, wherein the logging further comprises logging a type of the one or more uploaded files.

3. The computer-implemented method of claim 1, wherein the logging further comprises logging an average number of file uploads over a period of time.

4. The computer-implemented method of claim 1, wherein the logging further comprises logging an average number of file downloads over a period of time.

5. The computer-implemented method of claim 1, wherein the logging further comprises logging an amount of time between file-related actions.

6. The computer-implemented method of claim 1, wherein the allowing or disallowing new user actions comprises allowing or disallowing one or more of:
   uploading and downloading files, a number of files the user can upload or download, bandwidth that can be used by the user to upload or download files, bandwidth that other users can utilize to download files from the user, or whether the user can share content to the public.

7. The computer-implemented method of claim 1, wherein the monitoring is performed by monitoring one or more user behaviors.

8. The computer-implemented method of claim 7, wherein the one or more user behaviors comprise bandwidth that the user utilizes.

9. The computer-implemented method of claim 1, wherein the online service comprises an online storage service.

10. The computer-implemented method of claim 1, wherein the reputation category defines a set of allowed and disallowed actions for the new.

11. The computer-implemented method of claim 1, wherein the user does not have a history of past activities over time, with the online service, to serve as a basis for making a decision with respect to the user.

12. A computing device comprising:
one or more processors; and
one or more memories comprising instructions stored thereon that, responsive to execution by the one or more processors, implement an evaluation module, the evaluation module configured to perform operations comprising:
receiving a new user log on associated with a user initially signing up for an online service;
monitoring new user activities comprising first actions of the user after signing up for the online service, the new user activities including file-related actions associated with file sharing, at least one of the file-related actions comprising uploading or downloading one or more files using the online service;
logging the new user activities, the logging including logging at least one of an identifier of the or more uploaded files, a number of total file uploads, an identifier of one or more downloaded files, or a number of total file downloads;
transmitting the new user activities to a reputation service; and
receiving, from the reputation service a reputation category of the new user, the reputation category assigned to the user based on a comparison of the new user activities with a collection of historical activities associated with other users that indicate whether or not the new user activities are associated with a pattern that indicates an abuse pattern.

13. The computing device of claim 12, wherein the logging further comprises one or more of:
logging a type of the one or more uploaded files;
logging an average number of file uploads over a period of time;
logging an average number of file downloads over a period of time; or
logging an amount of time between file-related actions.

14. The computing device of claim 12, wherein the evaluation module is further configured to perform operations comprising allowing or disallowing new user actions for the user based upon the reputation category of the user received from the reputation service.

15. The computing device of claim 14, wherein the allowing or disallowing new user actions comprises allowing or disallowing one or more of:
uploading and downloading files, a number of files the user can upload or download, bandwidth that can be used by the user to upload or download files, bandwidth that other users can utilize to download files from the user, or whether the new user can share content to the public.

16. The computing device of claim 12, wherein the monitoring is performed by monitoring one or more user behaviors.

17. The computing device of claim 16, wherein the one or more user behaviors comprise bandwidth that the user utilizes.

18. The computing device of claim 12, wherein the online service comprises an online storage service.

19. The computing device of claim 12, wherein the user does not have a history of past activities over time, with the online service, to serve as a basis for making a decision with respect to the user.

20. A system comprising:
one or more modules implemented at least partially in hardware, the one or more modules configured to perform operations comprising:
receiving a new user log on associated with a user initially signing up for an online service;
monitoring new user activities comprising first actions of the user after signing up for the online service, the new user activities comprising file-related actions associated with file sharing, at least one of the file-related actions comprising uploading or downloading one or more files using the online service;
logging the new user activities, the logging including logging at least one of an identifier of the or more uploaded files, a number of total file uploads, an identifier of one or more downloaded files, or a number of total file downloads;
transmitting the new user activities to a reputation service; and
receiving, from the reputation service a reputation category of the user, the reputation category assigned to the user based on a comparison of the new user activities with a collection of historical activities associated with other users that indicate whether or not the new user activities are associated with a pattern that indicates an abuse pattern.

* * * * *